United States Patent [19]

Miyamura et al.

[11] Patent Number: 4,956,898
[45] Date of Patent: Sep. 18, 1990

[54] HOSE CLAMPING DEVICE

[75] Inventors: Masashi Miyamura, Kurobe; Nobuyuki Kawano, Nagaoka, both of Japan

[73] Assignee: Toyox Co., Ltd., Japan

[21] Appl. No.: 414,242

[22] Filed: Sep. 29, 1989

[30] Foreign Application Priority Data

Sep. 29, 1988 [JP] Japan .................. 63-128214[U]
Nov. 21, 1988 [JP] Japan .................. 63-152149[U]
Nov. 21, 1988 [JP] Japan .................. 63-152150[U]

[51] Int. Cl.$^5$ .............................................. F16L 33/08
[52] U.S. Cl. .................................. 24/274 R; 24/20 LS
[58] Field of Search ............... 24/274 R, 274 P, 279, 24/20 R, 19, 20 LS

[56] References Cited

U.S. PATENT DOCUMENTS

| 2,384,094 | 9/1945 | Jamie ................... 24/274 R |
| 3,028,650 | 4/1962 | Tinsley ................. 24/274 R |
| 4,221,030 | 9/1980 | Bernede ................ 24/274 R |
| 4,706,346 | 11/1987 | Verges ................. 24/274 R |

FOREIGN PATENT DOCUMENTS

| 1947731 | 4/1971 | Fed. Rep. of Germany .... 24/274 R |
| 914349 | 1/1963 | United Kingdom ............. 24/279 R |

Primary Examiner—James R. Brittain
Attorney, Agent, or Firm—Watson, Cole, Grindle & Watson

[57] ABSTRACT

A hose clamping device for reducing a winding diameter of a metallic band by rotation of a worm screw to clamp a flexible hose to a connector (nipple). The hose clamping device comprises a housing fixed to one side of a band formed with engaging portions, and a worm screw meshed with the engaging portion. The hose clamping device includes rotatably operation portions provided on both sides of a shaft of the worm screw, and a band spring-up preventive member provided in the jumping direction on the free end of the band in a housing.

2 Claims, 5 Drawing Sheets

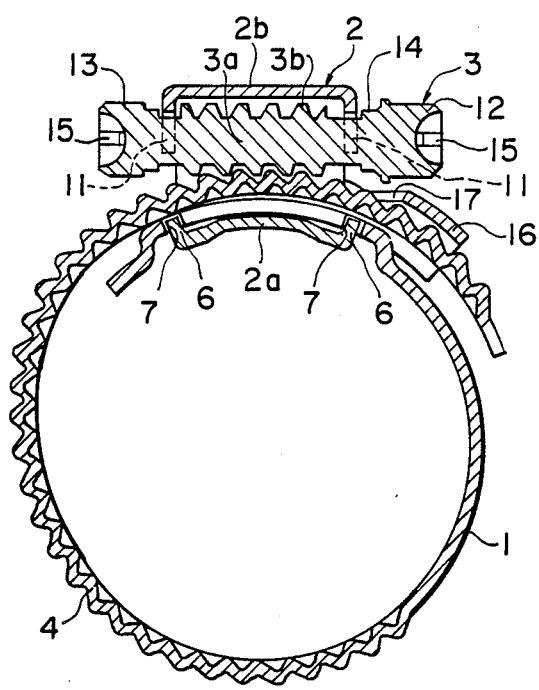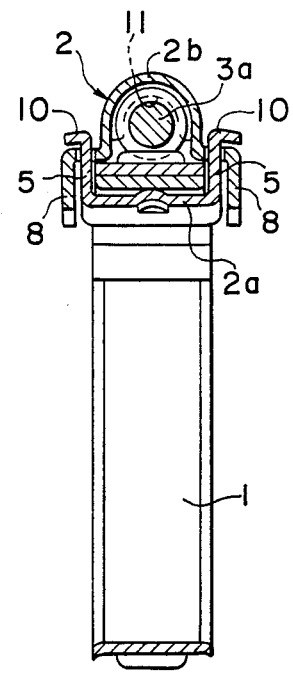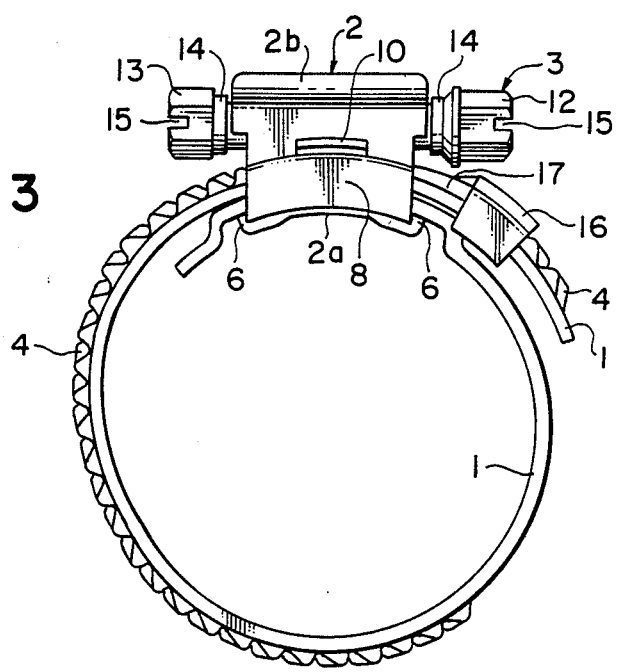

HOSE CLAMPING DEVICE

BACKGROUND OF THE INVENTION

1. Field of the Invention

The present invention relates to hose clamping devices, and more specifically to a hose clamping device in which a diameter of a metallic web band is reduced by rotation of a worm screw, and a flexible hose fitted in and connected to a connector (nipple) is clamped to the connector.

2. Description of the Prior Art

In a conventional hose clamping device using a worm screw, a metallic web band is subjected to punching or embossing to form engaging portions, a housing is fixed to a base of the web band, and a worm screw is supported within the housing so that the worm screw is rotated in its fixed position, the worm screw being rotated to move the web band in a peripheral direction. Such an art is proposed in Japanese Patent Publication No. 22676/1983 and many other publications.

Japanese Utility Model Application Laid-Open Publication No. 161780/1985 proposes a hose clamping device of the type as described above, in which a guide for guiding the web band is provided on the base side of the web band to prevent a free end of the band from being sprung up.

In the above-described conventional hose clamping devices, an operating portion for rotating the worm screw adapted to move the web band is provided only on one side (right side) of a shaft. Therefore, when the worm screw is rotated rightward, clamping takes place, whereas when rotated leftward, loosening takes place. When the operating portion is located in a wide space, no problem occurs. However, sometimes the operation is compelled to be accomplished in a narrow place (space) in terms of execution. At that time, the operation has to be performed in a very tight attitude since the operating portion is present only on one side. For a left-handed person, the rotating direction is reversed, so a problem is given rise to that the operation is difficult to perform.

Moreover, in the case where the operating portion is present only on one side, the mounting direction becomes decided. In the case where the device is set reversely, the band has to be removed and remounted, resulting in an inconvenience in operability.

Furthermore, when the worm screw for moving the web band is rotated, the web band engaged therewith is gradually drawn to reduce the winding diameter, and at the same time, the free end of the web band springs out of an opening of the housing, and spring action is exerted so that the free end of the web band springs up upwardly in an outer diameter direction.

This gives rise to problems that a finger is caught by the sprung-up portion of the web band to get hurt or clothes are caught thereby to cause injury.

In the conventional art for preventing the springup of the web band, the guide for the web band is provided on the base side of the web band. Since this guide comprises approximately L-shaped guide members opposedly provided on both sides widthwise of the band, these guide members function like ribs lengthwise of the web band so as to impair the curving operation of the web band. Accordingly, the expansion and contraction operation in a radial direction cannot be smoothly accomplished in the portion where the guide is provided, thus wanting in proper function of the clamping device which comes into close contact with the outer surface of the hose to uniformly clamp the whole peripheral surface. Separately from the aforementioned prior art, there is sometimes employed means in which a sprung-up portion of the web band is cut after having been completely clamped, in order to overcome a danger as noted above. In this case, there is a restriction that when in reuse, the clamping outer diameter should be smaller than the original clamping outer diameter.

SUMMARY OF THE INVENTION

The present invention has been accomplished in view of the problems as noted above with respect to prior art. It is an object of the present invention to provide a hose clamping device which can perform the operation of rotating the worm screw from either side end of the shaft and can be used safely while preventing a spring-up of the free end of the band.

For achieving the aforesaid object, the present invention provides a hose clamping device characterized in that rotatably operating operating portions are provided on opposite sides of a shaft of a worm screw mounted rotatably at a fixed position, and a spring-up preventive member is disposed on the side end of a housing from which a free end of a band is jumped out.

The aforesaid operating portion may be of any suitable form, such as a (−) or (+) groove in which a (−) or (+) driver is fitted, or a shaft whose outer peripheral shape is a noncircular such as a hexagon. One or more operating portions are formed.

The spring-up preventive member provided on the housing is formed along the winding peripheral direction of the band. The side end of the spring-up preventive member may be of a release state but the left and right sides thereof may be wound and engaged in recesses formed in the band. The housing is composed of upper and lower members, and one side of the band is secured to the lower member.

In the clamping device set externally of a hose fitted in a connector such as a nipple, the worm screw may be rotated rightward normally and leftward oppositely thereto. The free end of the web band drawn in the winding direction of the band by the rotation of the worm screw is guided from the opening of the housing into the spring-up preventive member and comes into contact with the inner surface of the preventive member to prevent the diametral and outward spring-up.

BRIEF DESCRIPTION OF THE DRAWINGS

FIG. 1 is a longitudinal sectional front view of the device according to one embodiment of the present invention;

FIG. 2 is a longitudinal sectional side view of the same;

FIG. 3 is a front view of the same;

FIG. 7 is a longitudinal sectional front view;

FIG. 8 is a sectional view taken on line (8)—(8) of FIG. 7; and

FIG. 9 is an exploded perspective view.

DETAILED DESCRIPTION OF THE PREFERRED EMBODIMENTS

Figure 4:
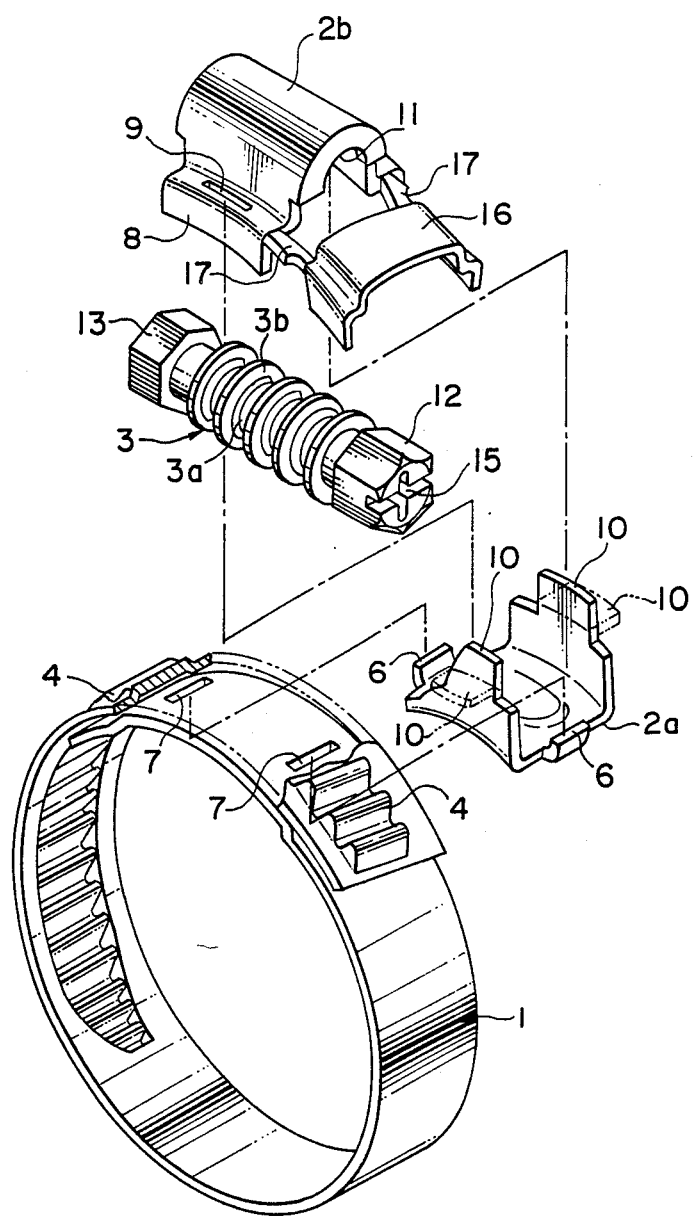
FIG. 4 is an exploded perspective view.

FIGS. 1 to 3 show an embodiment in which rotatably operating operating portions are provided on both sides of a worm screw. Reference numeral 1 designates a band, 2 a housing fixed to a base of the band 1, and 3 a worm screw encased in the housing 2 so that the worm screw can be rotated at a fixed position.

The band 1 is formed from a web-like stainless plate having a predetermined width. Engaging portions 4 are embossed at a predetermined pitch, the engaging portion 4 being inclined at a predetermined angle from the middle position lengthwise of the band to the fore end thereof. The housing 2 is fixed to the surface of the base not formed with the engaging portions 4.

The engaging portions 4 formed on the band 1 have an asymmetrical trapezoidal sectional shape so that the engaging portions 4 are stably and positively meshed with worms of the worm screw 3 which will be described later.

The housing 2 fixed to the base of the band 1 comprises a lower member 2a engaged with the back of the band 1 and an upper member 2b engaged with the lower member 2a. The lower member 2a is integrally formed with side walls 5 erected on both sides widthwise of the band 1. Engaging members 6 are bent directed upwardly on the both sides of the band 1 along the lengthwise thereof and mounted in mounting holes 7 bored in the band 1.

The upper member 2b is formed into an inverted U shape. An insert member 10 provided on the side wall 5 of the lower member 2a is inserted into an insert hole 9 bored in the side wall 8. The upper and lower members 2b and 2a are integrally connected by being outwardly and horizontally bent.

Keep members 11 are vertically downwardly provided in openings on both sides of the upper member 2b along the lengthwise to hold at a fixed position the worm screw 3 encased in the housing 2.

In the worm screw 3 encased in the housing 2, a worm 3b is formed in the peripheral surface in the central portion of a shaft 3a, and head operating portions 12 and 13 are formed on both side ends of the shaft 3a projected outwardly from the housing 2. Between the worm 3b in the shaft 3a and the operating portions 12 and 13 is formed a shoulder 14 with which is engaged the inverted U-shaped keep member 11 formed on the housing 2, whereby the worm screw 3 is prevented from axial movement and is rotated at a fixed position.

The operating portions 12 and 13 have a regular hexagon in outer configuration and are formed in the side end thereof with a deep cross groove 15. One groove constituting the cross groove 15 is open to the peripheral surface. The worm screw 3 may be rotated even by the (−) type driver. It is noted that the operating portions 12 and 13 may be changed in size so as to discriminate the normal side for rightward rotation and the opposite side for leftward rotation.

On the side end of the upper member 2b in the housing 2, that is, on the side end from which the release end of the band 1 projects, is integrally provided a spring-up preventive member 16 having an approximately gate shape in front through a connecting member 17 continuous to the side wall 8. The direction in which the spring-up preventive member 16 is provided is projected along the peripheral direction about which the band 1 is wound.

While the spring-up preventive member 16 may be maintained in its disposed state only by the strength of the connecting member 17, it is noted that the free end of the spring-up preventive member 16 may be engaged to prevent a levitation of the member 16 in the diametral and outward direction and the movement thereof in the diametral and inward direction.

Figure 5:
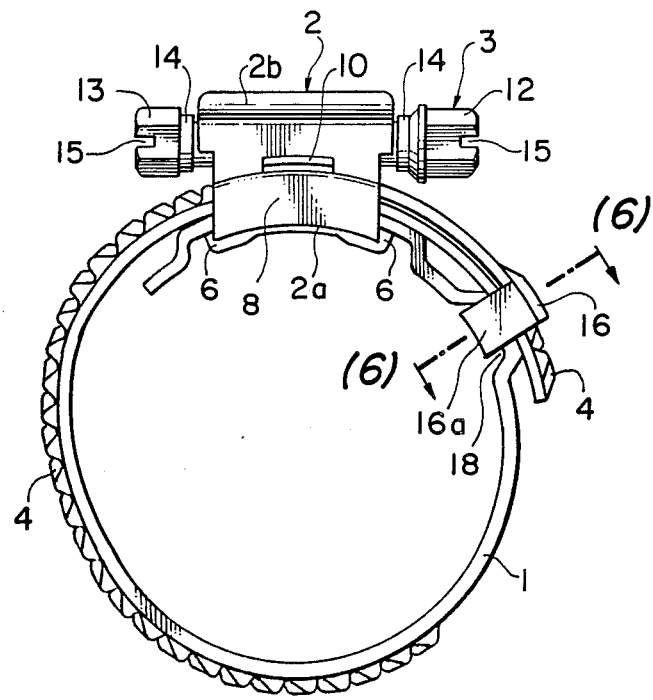
FIG. 5 is a front view showing a modified example of a spring-up preventive member.
Figure 6:
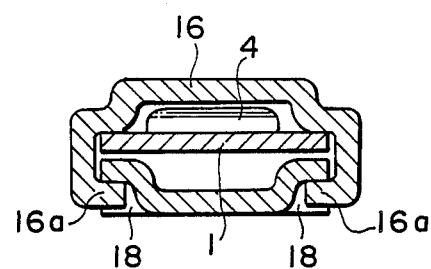
FIG. 6 is an enlarged sectional view taken on line (6)—(6) of FIG. 5.

That is, as shown in FIG. 5, a recess 18 inflated in the diametral and outward direction is formed at a position extended lengthwise of the band 1 from a position in which the lower member 2a of the housing 2 in the band 1. The recess 18 has its depth which is approximately the same as a thickness of the spring-up preventive member 16 or larger than the thickness. The lower sides in the left and right side walls 16a on the free end of the spring-up preventive member 16 are inwardly bended, wound and engaged with the recess 18.

Figure 7:
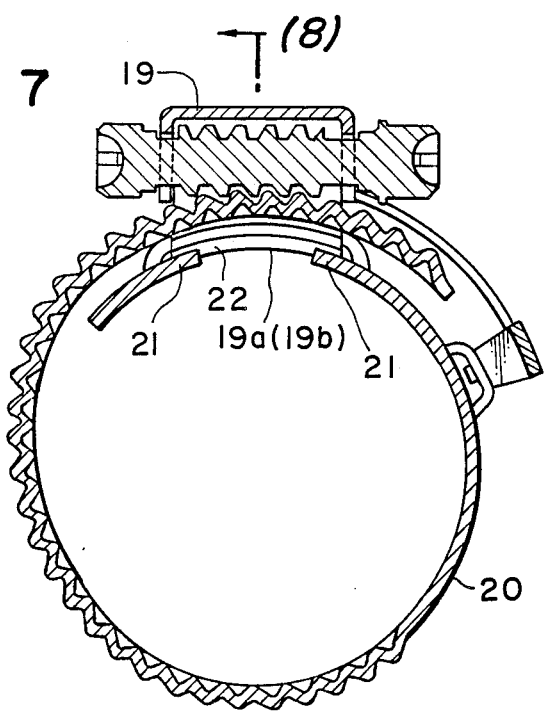
FIGS. 7 to 9 show another modified example of a housing.
Figure 8:
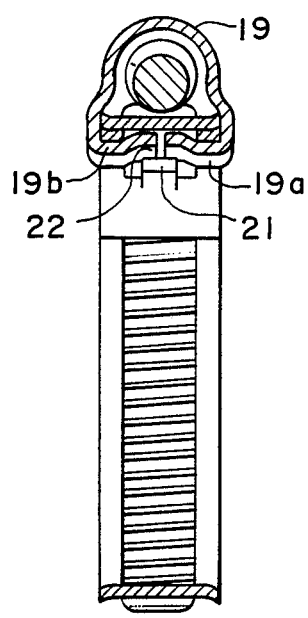
Figure 9:
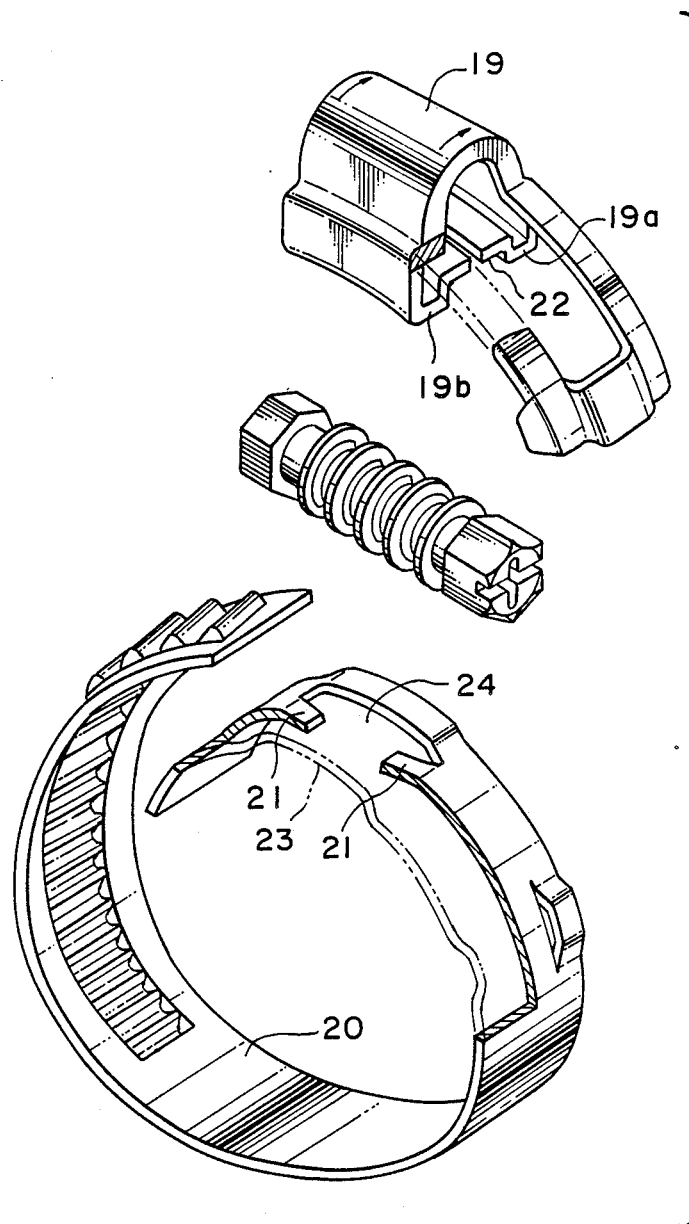

FIGS. 7 to 9 show the construction wherein a housing is composed of a single member. Both side members 19a and 19b of a housing 19 formed into a tunnel-like curve are downwardly wound. Front and rear sides in the central portion widthwise in the lower surfaces of the left and right winding members 19a and 10b are inflated to form an enagaging recess 22 into which is enageably fitted engaging pawls 21 formed in a band 20.

A portion of the band 20 to which the housing is fixed is upwardly bended to form a recess 23 so as to receive therein the winding members 19a and 19b of the housing 19. The upper surface wall of the recess 23 is formed with a notch 24 in which is fitted a projecting portion which forms a recess 22 inflated from the winding members 19a and 19b. The engaging pawl 21 fitted in and engaged with the recess from the front and rear side edge of the recess is formed by cutting the notch 24.

Accordingly, the left and right winding members 19a and 19b of the housing are wound and fitted into the recess 23 of the band 20, the projecting portions of the winding members are fitted into the notch 24, and the engaging pawl 21 is fitted in the recess 22 and then caulked. Thereby, the housing 19 can be fixed in position to the band 20, and the curved inner surface of the band 20 has the same face as the lower surface of the winding members 19a and 19b of the housing 19. Therefore, a danger of giving a damage to the hose fitted internally of the wound band 20 is positively overcome.

In the hose clamping device constructed as described above, by rotation of the worm screw 3, the band 1 with which the engaging portions 4 are meshed is gradually wound to reduce the winding diameter formed by the band 1. Thus the hose fitted in and connected to the nipple can be clamped.

The rotation of the worm screw 3 adapted to move the band 1 can be operated on either side of the worm screw 3.

The free end of the band 1 jumped out from the side end of the housing 2 with the reduction in winding diameter is guided and inserted into the spring-up preventive member 16 provided on the housing 2 to prevent the free end of the band 1 from being sprung up.

As described in detail, according to the hose clamping device of the present invention, the rotatably operating operating portions are provided on both sides of the shaft of the worm screw, whereby the rotating operation of the worm screw for moving the band meshed with the worm screw can be performed on either side of the worm screw.

Accordingly, in the case where the mounting place is so narrow that the operation on the normal side (rightward rotation) is difficult to perform, the operation of leftward rotation can be performed by the operating portion on the opposite side. In addition, since the operating portion opposite the normal side is leftward rotation, a left-handed person can easily perform the operation with his left hand. Since the operating portions are provided on both sides of the worm screw, the mounting direction of the clamping device has a flexibility, thus elminating the necessity of remounting as experienced in prior art.

Furthermore, the band spring-up preventive member is provided toward the jumping direction of the band release end side in the housing enclosing therein the worm screw. Therefore, the spring-up of the free end of the band resulting from the reduction in the winding diameter of the band is suppressed by the aforesaid spring-up preventive member, as a result of which the band is drawn out in the winding direction thereof. Accordingly, there involves no danger of catching fingers or clothes in the band without cutting the projecting end of the band. Thus, the device can be safely used.

Moreover, in the case where the release end of the spring-up preventive member is engaged with the band, the spring-up preventive member is prevented from being leviated diametrally and outwardly to fully secure the function as the spring-up preventive member. The preventive member is not moved diametrally and inwardly even if an external force acts thereon. Accordingly, there involves no danger that the lower end of the side wall of the spring-up preventive member is forced into the hose to damage the latter. Thus, the device can be used safely.

What is claimed is:

1. A hose clamping device which comprises:
    an elongated clamping band which has a first end portion, a second end portion and a plurality of engagement means therealong,
    a housing which is attached to said first end portion of said clamping band and which provides a first end, a second end and a passageway that extends from said first end to said second end, the second end portion of said clamping band extending through said passageway from said first end to said second end of said housing to form said clamping band into a main portion having a generally circular shape and a projecting portion which extends beyond the second end of said housing,
    a worm screw which is stationarily mounted in said housing and which includes a central shaft that has worm threads that engage with said plurality of engagement means of said clamping band and a head end having means for engagement by an operating tool in order to rotate said worm screw and move the second end portion of said clamping band through the passageway in said housing to thereby increase or decrease the diameter of the generally circular shape formed by the main portion of said clamping band and the length of the projecting portion of the clamping band, and
    a band guide means which comprises two curved support arms extending away from the second end of said housing and a guide element connected between said two curved support arms, said guide element contacting the projecting portion of said clamping band to cause the projecting portion to extend in general conformity with the generally circular shape formed by the main portion of said clamping band.

2. The hose clamping device according to claim 1, wherein the first end portion of said clamping band includes a recess that extends along a width thereof and wherein said guide element includes opposite side walls that have bent ends that extend into said recess so as to prevent movement of said guide element outwardly relative to the main portion of said clamping band.

* * * * *